United States Patent
Spillman et al.

(10) Patent No.: US 6,569,562 B1
(45) Date of Patent: May 27, 2003

(54) ELECTROCHEMICAL CELL WITH NOVEL HEADER ASSEMBLY

(75) Inventors: David M. Spillman, Tonawanda, NY (US); Christine A. Frysz, New Milford, CT (US); Harvey A. Hornung, II, Clarence, NY (US); Esther S. Takeuchi, East Amherst, NY (US)

(73) Assignee: Wilson Greatbatch Ltd., Clarence, NY (US)

(*) Notice: Subject to any disclaimer, the term of this patent is extended or adjusted under 35 U.S.C. 154(b) by 0 days.

(21) Appl. No.: 09/564,401

(22) Filed: May 1, 2000

Related U.S. Application Data

(60) Provisional application No. 60/132,549, filed on May 5, 1999.

(51) Int. Cl.$^7$ .......................... H01M 6/46; H01M 2/00; H01M 2/02; H01M 2/08; H01M 6/00
(52) U.S. Cl. ................ 429/163; 429/162; 429/164; 429/175; 429/178; 429/181; 29/623.1; 29/623.2
(58) Field of Search ................... 629/162, 163, 629/164, 175, 178, 181; 29/623.1, 623.2

(56) References Cited

U.S. PATENT DOCUMENTS

| | | | |
|---|---|---|---|
| 3,898,104 A | * | 8/1975 | da Costa ................ 429/166 |
| 4,158,721 A | | 6/1979 | Decker et al. ............ 429/174 |
| 4,358,514 A | | 11/1982 | Garoutte et al. ........... 429/181 |
| 4,371,592 A | | 2/1983 | Gabano ...................... 429/91 |
| 4,442,184 A | * | 4/1984 | Spanur ........................ 429/54 |
| 4,792,503 A | | 12/1988 | Eppley ....................... 429/181 |
| 5,004,656 A | * | 4/1991 | Sato et al. .................. 429/162 |
| 5,080,985 A | * | 1/1992 | Wiacek et al. ............. 429/172 |
| 5,312,458 A | | 5/1994 | Muffoletto et al. ........ 29/623.1 |
| 5,458,996 A | | 10/1995 | Itoh et al. ................... 429/196 |
| 5,601,951 A | * | 2/1997 | Johnson et al. ............. 429/218 |
| 5,856,041 A | * | 1/1999 | Inoue et al. ................ 429/182 |

FOREIGN PATENT DOCUMENTS

| | | |
|---|---|---|
| EP | 026439 A1 | 7/1987 |
| JP | 59103274 | 6/1984 |

OTHER PUBLICATIONS

Patents Abstracts of Japan vol. 008. No. 217 (E–270), Oct. 4, 1984 & JP 59 103274 A (Hitachi Maxwell KK), Jun. 14, 1984 *abstract*.

* cited by examiner

*Primary Examiner*—Patrick Ryan
*Assistant Examiner*—Julian Mercado
(74) *Attorney, Agent, or Firm*—Michael F. Scalise

(57) ABSTRACT alkali metal electrochemical cell capable of discharge at elevated pressure and temperature is described. To help increase the cell's pressure tolerance, the cell header has an internal groove surrounding the glass-to-metal seal.

33 Claims, 5 Drawing Sheets

ELECTROCHEMICAL CELL WITH NOVEL HEADER ASSEMBLY

CROSS REFERENCE TO RELATED APPLICATION

The present application claims priority based on provisional application Serial No. 60/132,549, filed May 5, 1999.

BACKGROUND OF THE INVENTION

1. Field of the Invention

The present invention generally relates to the conversion of chemical energy to electrical energy and, in particular, to an alkali metal electrochemical cell or a lithium ion rechargeable electrochemical cell capable of discharge at elevated pressures and temperatures.

2. Prior Art

It is known that the useful operating temperature range of a lithium electrochemical cell can be extended beyond 180.54° C., the melting point of lithium, and up to approximately 200° C. The operating temperature is increased, in part, by providing the anode as a lithium alloy, such as a lithium-magnesium alloy. Although functional, conventional lithium cells manufactured for such high temperature applications exhibit serious deficiencies. In particular, the energy density of a prior art lithium cell is decreased due to the use of a ferrule included in the header assembly. The ferrule is required to maintain electrical isolation of the terminal lead within the header assembly and to prevent the cell from leaking.

According to the present invention, it has been discovered that the energy density of an electrochemical cell, either of a primary or a secondary chemistry, intended for use in elevated pressure and temperature applications can be significantly improved through the use of a novel header assembly which eliminates the use of a ferrule.

SUMMARY OF THE INVENTION

The present invention describes an improved header assembly. The present header assembly retains hermeticity when the cell is discharged under a high rate at an elevated temperature while simultaneously increasing the cell's energy density by allowing for the inclusion of additional electrochemically active components. During discharge at temperatures up to about 200° C., lithium cells of either a primary or a secondary chemistry produce gaseous by-products which increase the pressure within the cell. Therefore, the header assembly including the glass-to-metal seal must be capable of withstanding this increased pressure while retaining hermeticity under all use conditions. If hermeticity is not retained, the compromised cell is inoperable and may vent or explode.

As discussed earlier, prior art lithium cells typically contain a ferrule which supports the glass-to-metal seal. The ferrule serves to minimize deflection of the header assembly and to reduce internal stresses and forces placed upon the glass-to-metal seal. Although prior art ferrule constructions allow a lithium cell to remain operational at temperatures up to about 200° C., there are several drawbacks to them. First, conventional ferrules typically take the form of a ring welded to the header assembly. Therefore, simply having a ferrule increases the cost of the header assembly and the resulting cell. Secondly, the ferrule ring is two to six times the thickness of the lid and projects downward into the cell, reducing the height available for the electrochemically active materials. This leads to a reduction in the energy density of the cell.

A novel header assembly according to the present invention eliminates the use of a ferrule. The lid of the header assembly is modified to include a concentric groove of a fixed width and depth. The groove is radially located a fixed distance from the edge of the glass-to-metal seal. The thickness of the lid and its location, width and depth depend upon the specific electrolyte used to activate the cell, the cell size and the intended discharge rate and temperature of the cell, among other parameters. The present header assembly is particularly useful in high temperature lithium cells and results in a significant increase in the cell's energy density through the inclusion of additional electrochemically active components. When discharged at temperatures up to about 200° C., the header retains hermeticity.

These and other objects of the present invention will become increasingly more apparent to those skilled in the art by reference to the following description and to the appended drawings.

DETAILED DESCRIPTION OF THE PREFERRED EMBODIMENTS

Figure 1:
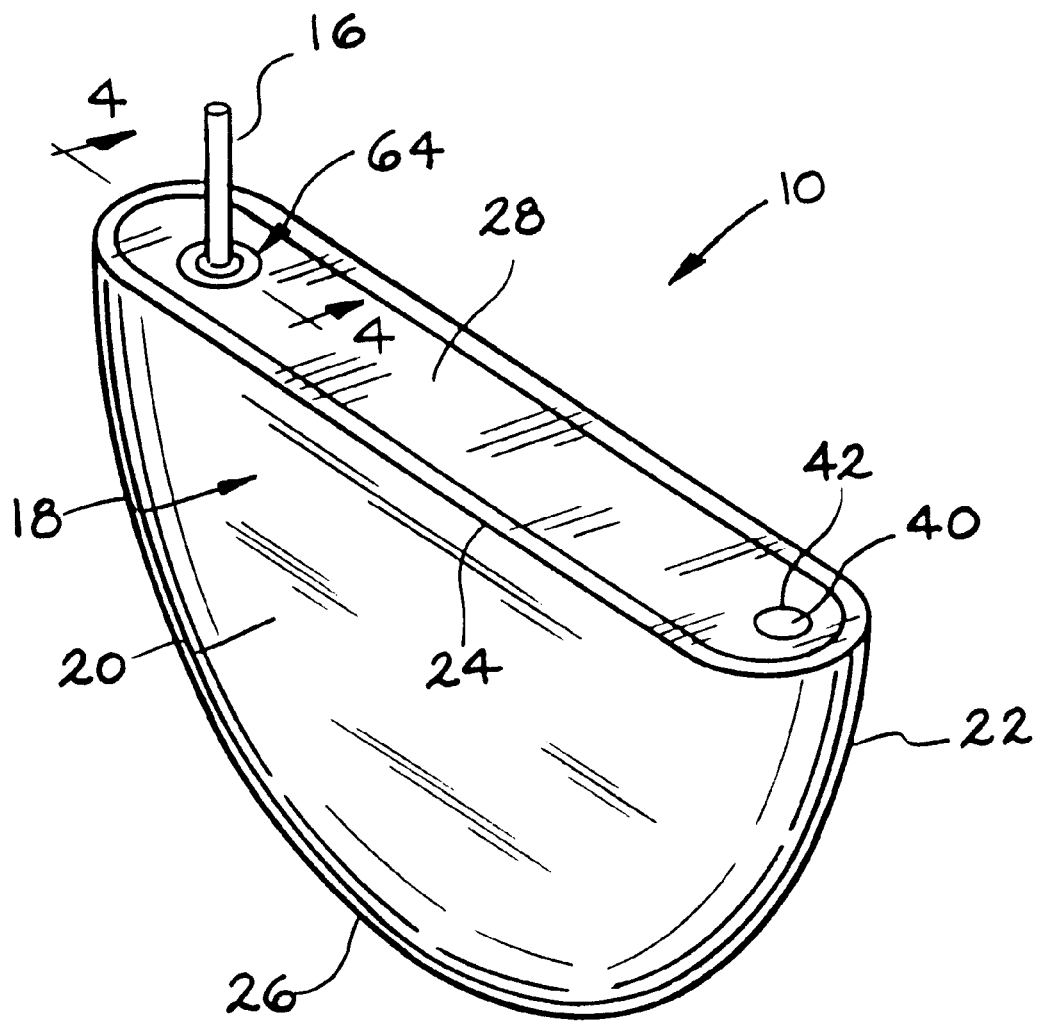
FIG. 1 is a perspective view of a prismatic electrochemical cell 10 according to the present invention.
Figure 2:
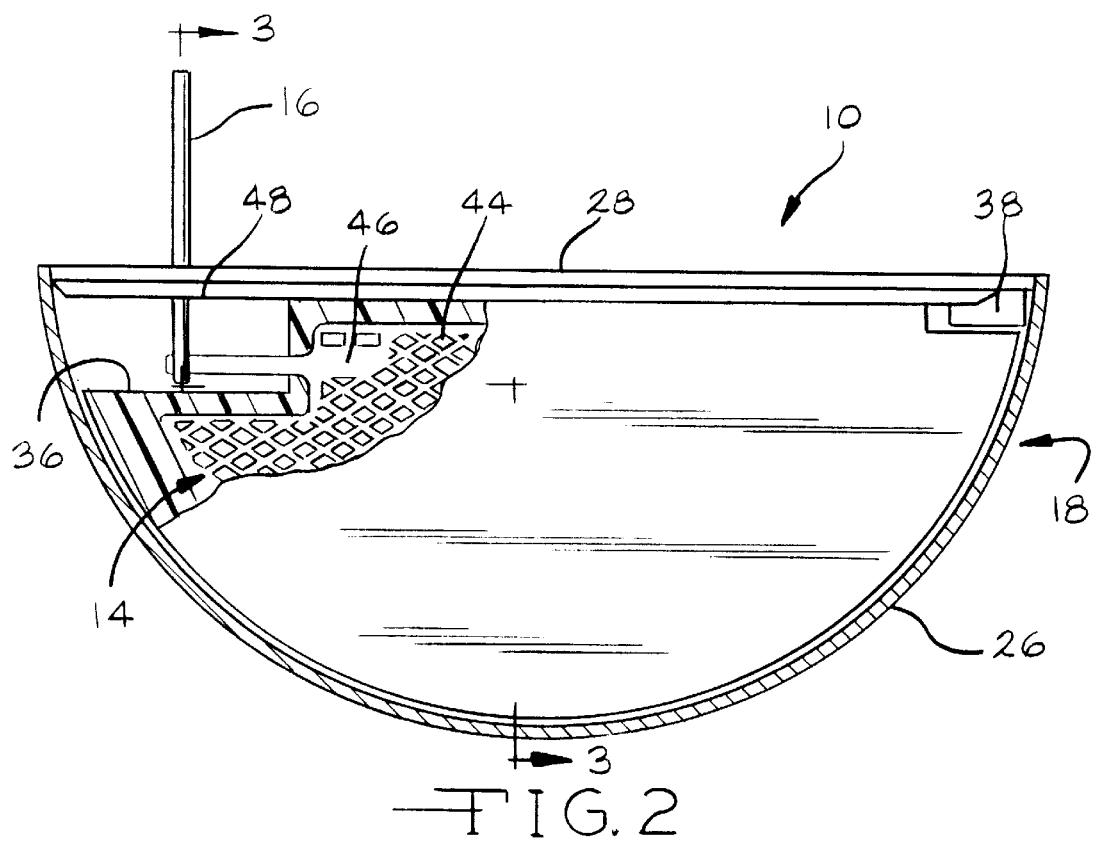
FIG. 2 is a side, cross-sectional view of the electrochemical cell 10.
Figure 3:
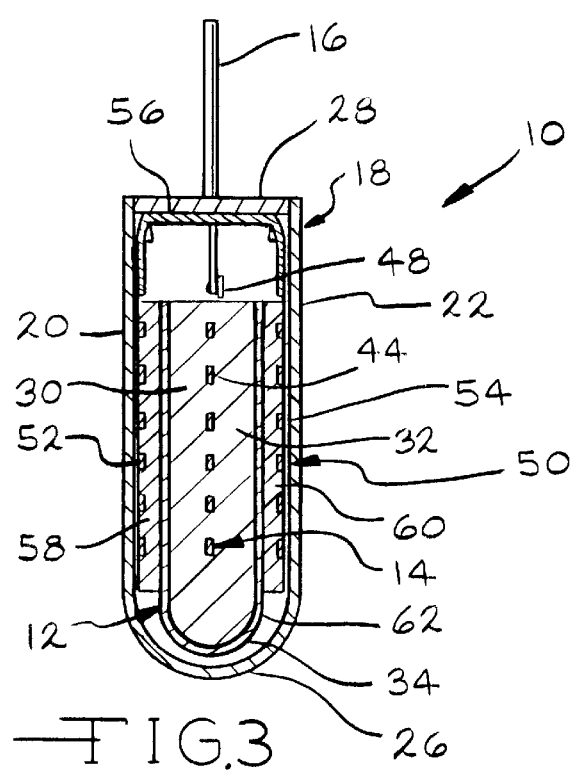
FIG. 3 is a cross-sectional view taken along line 3—3 of FIG. 2.

Referring now to the drawings, FIGS. 1 to 3 show a prismatic electrochemical cell 10 according the present invention. Cell 10 includes a cathode electrode 12 having a current collector 14 connected to a terminal lead 16. The cathode electrode 12 is readily incorporated into alkali metal/solid cathode or alkali metal/oxyhalide electrochemical cells of both solid cathode and liquid electrolyte types without having to be changed or otherwise modified.

The illustrated cell 10 is exemplary of the solid cathode type housed inside of a conductive casing 18. Casing 18 has spaced-apart, generally planar front and back side walls 20 and 22, each having a semicircular shape with an upper planar edge 24. The side walls 20, 22 are joined by a semicircular intermediate end wall 26 that curves to meet them along their entire radial perimeter. The open top of casing 18 is closed by a lid 28. Casing 10 is made of a conductive material preferably selected from the group consisting of nickel, aluminum, stainless steel, mild steel, tantalum, and titanium. External cell electrical connection is provided by the terminal lead 16 and by a contact region comprising the lid 28 or the entire conductive casing 18, which are insulated from the terminal lead 16.

The cathode electrode 12 has a body of solid cathode material in the form of cathode plates 30, 32 of an active mixture pressed or calendared against the cathode current collector 14. The cathode electrode 12 is provided with a full radius edge 34 which extends from adjacent to a step 36 (FIG. 2) and follows the radius and curvature of the intermediate end wall 26 of the casing to a position proximate an insulator structure 38 for a cell closure 40 provided in an electrolyte fill opening 42. This construction provides as great a quantity of cathode active material in electrochemical association with the anode as the internal volume of the casing 18 will accommodate.

The cathode current collector 14 comprises an apertured grid 44, an internal connection tab 46 in the form of a land that is co-planar with and surrounded on three sides by the grid 44, and an integral external connection tab 48. External connection tab 48 is an outwardly extending continuation of internal tab 46. The terminal lead 16 is shown connected to the external tab 48 in FIG. 2, however, it can be directly connected to the cathode current collector 14 at any contact point along the full extent of the internal tab 46 and the external tab 48. This construction is more thoroughly described in U.S. Pat. No. 5,750,286 to Paulot et al, which is assigned to the assignee of the present invention and incorporated herein by reference.

A preferred material for the cathode current collector 14 is a type 200 or 201 series nickel screen per ASTM B-162 specifications. Prior to use, the screen must be clean, bright and free of all grease and processing oils. The screen is preferably annealed.

Cell 10 further includes an anode electrode, for example an alkali metal anode electrode, generally designated 50. The anode electrode 50 comprises a unitary, conductive member which serves as the current collector and is fabricated from a thin sheet of metal, preferably nickel, having a pair of wing-like sections 52 and 54 joined by an intermediate web section 56. The anode current collector is preferably in an annealed, expanded form.

The preferred alkali metal for the anode is lithium or a lithium alloy. Lithium anode plates 58 and 60 are in pressure bonded contact with and carried by corresponding ones of the current collector wing sections 52 and 54, respectively. The wing-like sections 52 and 54 are of a mesh formation to facilitate adherence to the lithium anode elements 58, 60. The lithium anode elements 58 and 60 are of a similar shape or configuration as the corresponding wing sections 52 and 54, but of a slightly larger size or surface area so as to define a marginal or peripheral extension or border surrounding the perimeter of each current collector wing section. Thus, the length and width of each of the lithium anode elements 58 and 60 is slightly greater than the length and width of the corresponding wing sections 52 and 54 with the anode elements terminating a short distance from the electrode web section 56.

To construct an anode-cathode subassembly, the cathode plates 30 and 32 of solid cathode active material are first press contacted to the cathode current collector 14. The cathode active material is preferably comprised of a mixed metal oxide such as silver vanadium oxide and copper silver vanadium oxide, a fluorinated carbon material or in the case of an oxyhalide cell, a carbonaceous material. The cathode current collector 14 is fabricated from a thin sheet of metal selected from the group consisting of cobalt-nickel alloys, chromium ferritic, nickel alloys, aluminum, stainless steel, mild steel and titanium with titanium being preferred.

The anode wing sections 52, 56 with the associated anode lithium elements 58, 60 are then folded relative to web section 56 and toward each other and in a manner to place the lithium anode elements 58, 60 in operative contact with the oppositely directed major surfaces of the cathode plates 30 and 32 joined together on either side of the current collector 14. Shielding and insulating sheets (not shown) are positioned between the web 56 and the cathode electrode.

In particular, lithium anode element 58 is in operative contact with the cathode plate 30 through a portion of a separator material 62. Similarly, lithium anode element 60 is in operative contact with cathode plate 32 through another portion of the separator 62 which surrounds and envelopes the cathode body to prevent direct physical contact with the anode. The terminal lead 16 is then connected to the cathode current collector 14 extending through the header assembly comprising a novel glass-to-metal seal 64 fitted in the lid 28.

Figure 4:
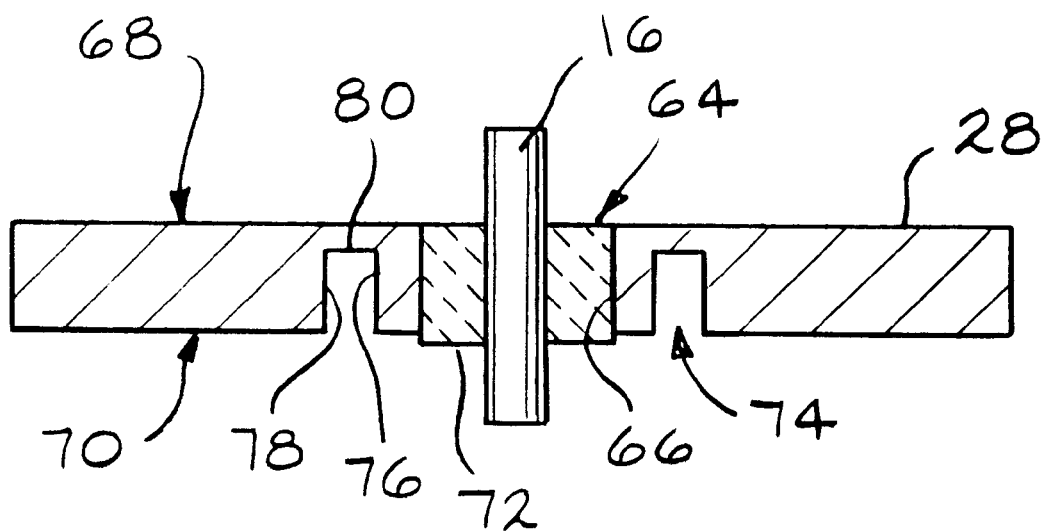
FIG. 4 is a cross-sectional view taken along line 4—4 of FIG. 1.

As shown in FIG. 4, the glass-to-metal seal 64 of the present invention comprises a cylindrical wall 66 provided in the lid between its upper surface 68 and its lower surface 70. The cylindrical wall 66 has a longitudinal axis disposed perpendicular to the upper and lower surfaces 68 and 70 and provides the lid with sufficient thickness between the surfaces to support a glass material 72. The lid 28 is preferable about 0.05 inches to about 0.2 inches in thickness. The glass material 72 is hermetically sealed between the terminal lead 16 and the cylindrical wall 66. The terminal lead 16 resides on the longitudinal axis of the cylindrical wall 66.

According to one embodiment of the present invention, an annular groove 74 is provided in the lid, surrounding the cylindrical wall 66 and the terminal pin 16. The groove 74 extends from the lower surface 70 of the lid and has the shape of a channel comprising an inner side wall 76 and an outer side wall 78 extending to and meeting an intermediate wall 80. The side walls 76 and 78 are preferably concentric about the terminal lead 16 and the intermediate wall is preferably parallel with the upper and lower lid surface 68 and 70. Generally, the concentric groove 74 is located at a fixed radial distance of between about 10% to about 90% of the distance from the lead 16 to the edge of the lid 28. The depth of the groove 74 varies between about 10% to about 90% of the thickness of the lid 28 and the width of the groove 74 varies between about 1% to about 50% of the fixed radial distance between the lead 16 and the edge of the lid 28.

It is believed that the improved header assembly of the present invention retains hermeticity, in part, in the following manner. When the internal pressure generated within the cell 10 increases as a result of gaseous discharge products, from internal heat generated during cell discharge and from external heat or elevated ambient temperature, the resulting internal stresses or forces cause a deflection of the lid 28 in the vicinity of the concentric groove 74. The lid 28 preferentially deflects in this area, resulting in a decrease in the stresses and forces applied to the glass-to-metal seal.

Thus, it is believed that the present header assembly including the lid 28 and the glass-to-metal seal 64 increases the cell's energy density by eliminating the ferrule ring used in prior art designs. With the ferrule ring removed, the height of the electrode assembly and the volume of electrochemically active materials within the casing 18 are increased. This, in turn, leads to an increase in the energy density of the cell. In that respect, the additional void volume within the cell 10 is useful in increasing the volume of anode and cathode active materials, which aids in decreasing the internal pressure generated within the cell. After the anode/cathode electrode assembly is positioned inside the casing 18 and the lid 28 is hermetically sealed to the casing such as by welding, cell 10 is completed by a nonaqueous electrolyte for a solid cathode cell, and in the case of an oxyhalide cell, liquid depolarizer provided in casing 18 and sealed therein by the provision of the closure 40 welded in the opening 42 to hermetically close the cell 10. Lead 16 is the positive electrical terminal connected to the cathode body electrode 12. With anode electrode 50 in operative contact with the conductive casing 18 through the web section 56 of the anode current collector in electrical contact therewith, the cell 10 of the present invention is in a case-negative electrical configuration.

The cathode current collector 14 is preferably of titanium. The lid is preferably of stainless steel, and a suitable glass for the glass-to-metal seal 64 of a lithium oxyhalide cell is GBC614U while a suitable terminal pin material is 52 Alloy. Other materials which are suitable for glass seal 72 include CABAL 12 TA-23, FUSITE 425 or FUSITE 435 hermetic sealing glass, and cell closure 40 is of stainless steel, titanium or nickel.

The metallic case may comprise materials such as stainless steel, mild steel, nickel-plated mild steel, titanium, tantalum, or aluminum, but not limited thereto, so long as the metallic material is compatible for use with components of the cell. Floor a stainless steel lid, the casing is also preferably stainless steel.

The electrochemical cell 10 of the present invention can also be constructed having a case-positive electrical configuration provided by placing the cathode parts in contact with the conductive cell casing 18. In particular and referring to the anode-cathode subassembly of FIGS. 2 and 3, a case-positive electrical configuration is provided by replacing lithium anode elements 58, 60 with cathode plates 30, 32 on the electrode wing sections 52, 54. Accordingly, cathode electrode 12 is replaced by the pair of lithium anode elements 58, 60, each sandwiched together and against the apertured grid 40 serving as an anode current collector which, in turn, is connected to the terminal lead 16 via electrical contact to at least one of the internal connection tab 46 and the external connection tab 48, and with the lead 16 insulated from lid 28 by the glass-to-metal seal 52. With the cathode plates 30, 32 in contact with electrode wing sections 52, 54 and with the electrode web section 56 in contact with the cell casing 18, a cell is provided in a case-positive electrical configuration. In all other respects, the anode electrode in the case-positive configuration is similar to that previously described with respect to cell 10 having the case-negative configuration.

Figure 5:
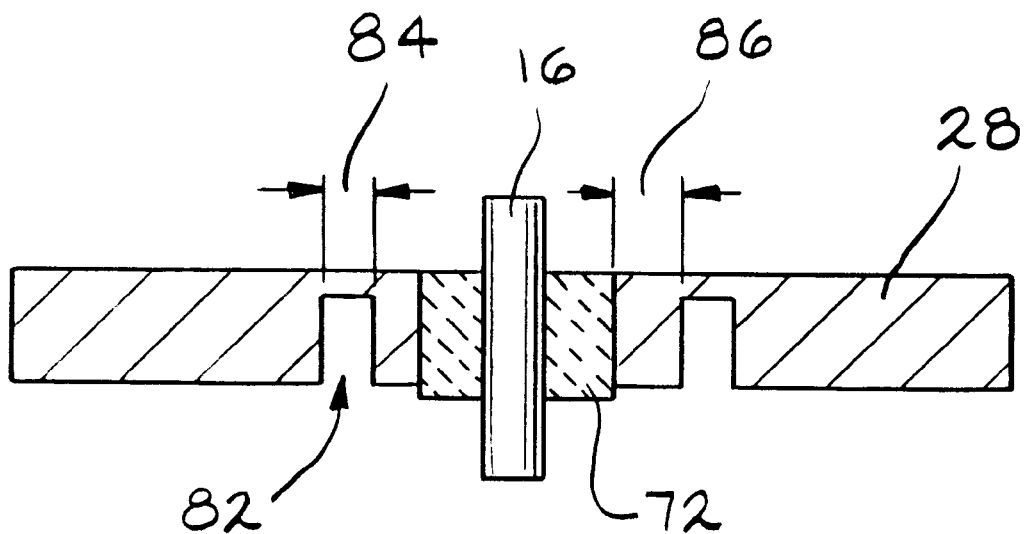
FIGS. 5 to 7 illustrate alternate embodiments of a groove surrounding the terminal lead 16 according to the present invention.
Figure 6:
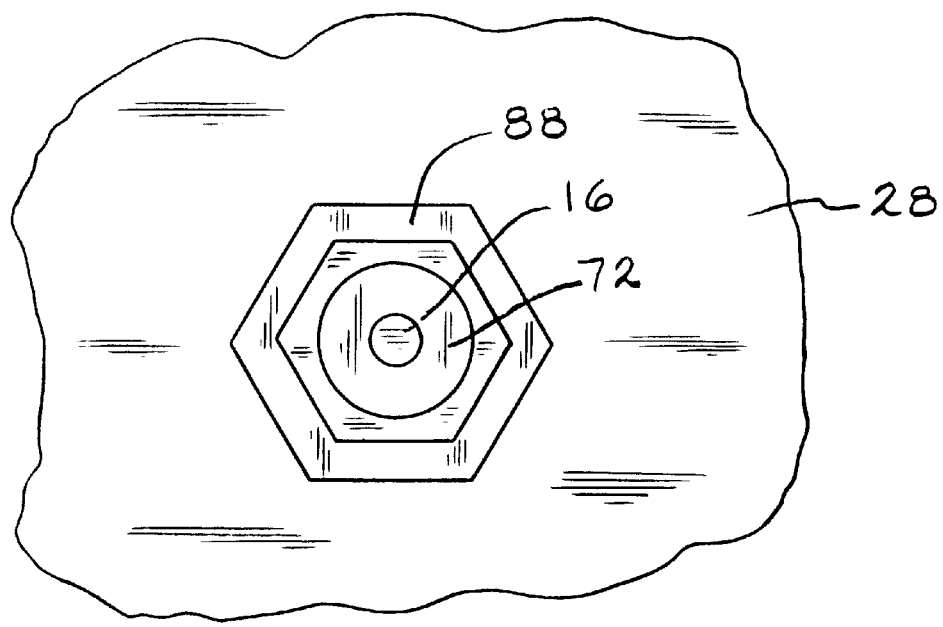
Figure 7:
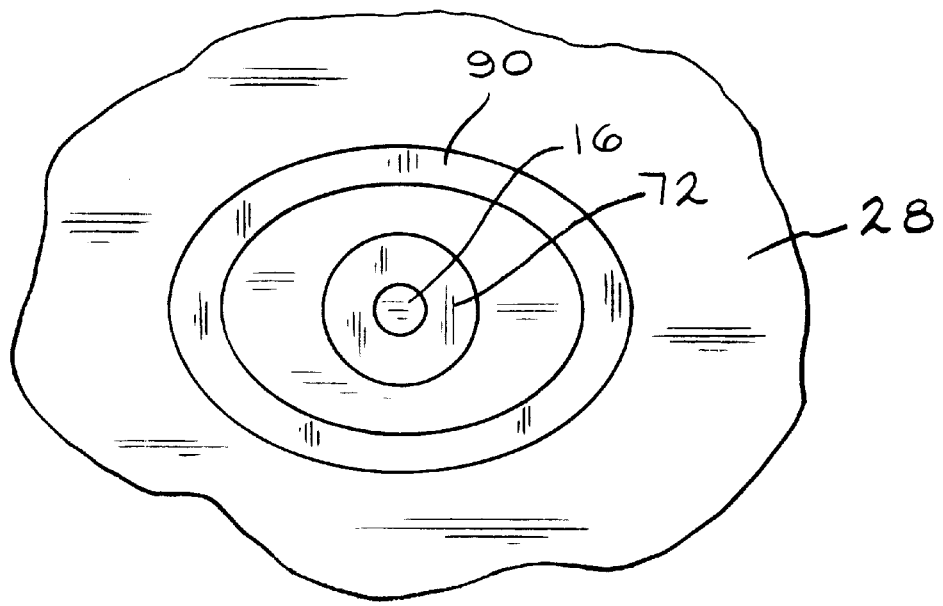

While the groove 74 is described as being concentric with the terminal lead 16, that may not be preferred for every cell construction. According to another embodiment of the present invention, the groove 82 (FIG. 5) may be offset with respect to the longitudinal axis of the lead 16. As shown, the distance 84 between the groove 82 and the lead 16 is less than the distance 86. Furthermore, the groove 88 may not necessarily have a circular shape, but it may have a square, rectangular, hexagonal (FIG. 6) or some other multi-sided shape. Or, the groove 90 may even have an irregular shape, as shown in FIG. 7. In fact, the shape of the groove is limited only by the imagination of those skilled in the art and by the requirements of a particular battery application.

Figure 8:
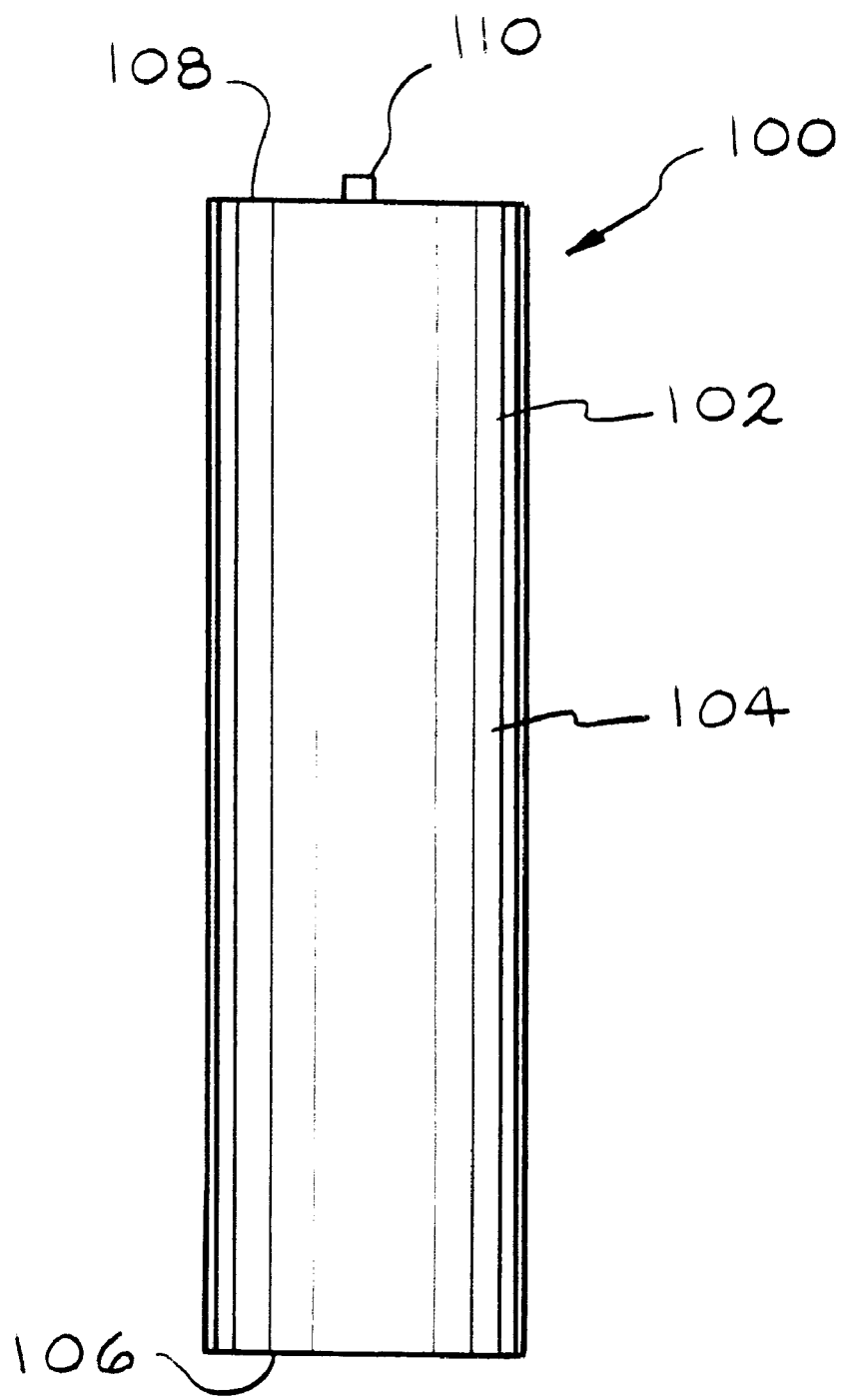
FIG. 8 is a side-elevational view of a spirally-wound cell 100 housed in a cylindrical casing 102.

Those skilled in the art will readily recognize that while the present header assemblies shown in FIGS. 4 to 7 are described with respect to a prismatic cell, that is by way of illustration only. The groove and header assemblies are readily adapted to a wide variety of cell constructions including spirally-wound cells, button-shaped and coin-shaped cells and batteries. For example, FIG. 8 generally shows a spirally-wound electrochemical cell 100 housed in a casing 102. Casing 102 has a cylindrically-shaped side wall 104 closed at its lower end by a bottom wall 106 and at the top by header 108. The header 108 includes a glass-to-metal seal (not shown) which electrically insulates terminal lead 110 from the rest of the casing 102 by any one of the assemblies shown in FIGS. 4 to 7 having an internal groove surrounding the lead.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode;
   b) a cathode;
   c) an electrolyte activating the anode and the cathode;
   d) a casing housing the activated anode and cathode disposed in its interior, wherein the casing has a thickness between an outer surface and an inner surface and serves as a first terminal for one of the anode and the cathode, and a lead insulated from the casing serves as a second terminal for the other of the anode and the cathode; and
   e) a groove extending from the inner surface of the casing a portion of the way through its thickness towards the outer surface and surrounding the lead insulated from the casing, wherein the groove comprises a first side wall connected to a spaced apart second side wall by an intermediate bottom wall, the first and second side walls surrounding the lead at respective first and second distances, the first distance being less than the second distance, wherein a phantom axial projection of the second side wall extends entirely through the casing thickness along the lead and wherein the first and second side walls are parallel to each other and perpendicular to a surrounded portion of the outer surface of the casing extending perpendicularly from the phantom axial projection to an inner edge of the casing adjacent to and surrounding the insulated lead and wherein, with the cell in its fully assembled condition, the groove is unoccupied and in pressure communication with the interior of the casing.

2. The electrochemical cell of claim 1 wherein the groove is channel-shaped.

3. The electrochemical cell of claim 1 wherein the groove is concentric with the lead.

4. The electrochemical cell of claim 1 wherein the groove is provided in a lid comprising the casing and sealing an open end thereof and wherein the groove is located at a radial distance from the lead of about 10% to about 90% of the distance from the lead to an edge of the lid.

5. The electrochemical cell of claim 1 wherein the groove extends about 10% to about 90% of the way through the thickness of the casing.

6. The electrochemical cell of claim 1 wherein the groove is provided in a lid comprising the casing and sealing an open end thereof and wherein a width of a diameter of the groove is about 10% to about 50% of the distance from the lead to an edge of the lid.

7. The electrochemical cell of claim 1 wherein the groove is offset with respect to the lead.

8. The electrochemical cell of claim 1 wherein the groove is multi-sided.

9. The electrochemical cell of claim 1 wherein the groove has an oval shape.

10. The electrochemical cell of claim 1 as a primary cell having a lithium or a lithium alloy anode.

11. The electrochemical cell of claim 1 wherein the cell is selected from the group consisting of a prismatic cell, a spirally-wound cell housed in a cylindrical casing, a button-shaped cell and a coin-shaped cell.

12. The electrochemical cell of claim 1 wherein the casing is of an electrically conductive material.

13. A method for providing an electrochemical cell, comprising the steps of:
   a) providing an anode;
   b) providing a cathode;
   c) housing the anode and the cathode in a casing having an open end;
   d) providing a lid supporting a lead insulated from the lid by a glass-to-metal seal;
   e) providing a groove extending from an inner surface of the lid a portion of the way through its thickness towards an outer surface and surrounding the lead, wherein the groove comprises a first side wall connected to a spaced apart second side wall by an intermediate bottom wall, the first and second side walls surrounding the lead at respective first and second distances, the first distance being less than the second distance, wherein a phantom axial projection of the second side wall extends entirely through the lid thickness along the lead and wherein the first and second side walls are parallel to each other and perpendicular to a surrounded portion of the outer surface of the lid extending perpendicularly from the phantom axial projection to an inner edge of the lid adjacent to and surrounding the insulated lead;
   f) hermetically sealing the lid to the open end of the casing housing the anode and the cathode, the casing serving as a first terminal for one of the anode and the cathode, and the lead insulated from the lid serving as a second terminal for the other of the anode and the cathode and wherein, with the cell in its fully assembled condition, the groove is unoccupied and in pressure communication with the interior of the casing; and
   g) activating the anode and the cathode with an electrolyte.

14. The method of claim 13 wherein the groove is channel-shaped.

15. The method of claim 13 wherein the groove is concentric with the lead.

16. The method of claim 13 including providing the groove being located at a radial distance from the lead of about 10% to about 90% of the distance from the lead to an edge of the lid.

17. The method of claim 13 including providing the groove extending about 10% to about 90% of the way through the thickness of the lid.

18. The method of claim 13 including providing a diameter of the groove being about 10% to about 50% of the distance from the lead to an edge of the lid.

19. The method of claim 13 including providing the groove offset with respect to the lead.

20. The method of claim 13 including providing the groove having a multi-sided shape.

21. The method of claim 13 including providing the groove having an oval shape.

22. The method of claim 13 including providing the cell having a lithium or a lithium alloy anode.

23. An electrochemical cell, which comprises:
   a) an anode;
   b) a cathode;
   c) an electrolyte activating the anode and the cathode;
   d) a casing housing the activated anode and cathode disposed in its interior, wherein the casing serves as a first terminal for one of the anode and the cathode, and a lead insulated from the casing serves as a second terminal for the other of the anode and the cathode; and
   e) a groove extending from the inner surface of the casing a portion of the way through its thickness towards the outer surface and surrounding the lead insulated from the casing, wherein the groove surrounds the lead and comprises a first side wall connected to a spaced apart second side wall by an intermediate bottom wall, the first and second side walls surrounding the lead at respective first and second distances, the first distance being less than the second distance, wherein a phantom axial projection of the second side wall extends entirely through the casing thickness along the lead and wherein the intermediate bottom wall is parallel to inner and outer surrounded portions of the respective inner and outer surfaces of the casing, the surrounded inner and outer surface casing portions bounded by the phantom axial projection to an inner edge of the casing adjacent to and surrounding the insulated lead and wherein, with the cell in its fully assembled condition, the groove is unoccupied and in pressure communication with the interior of the casing.

24. The electrochemical cell of claim 23 wherein the groove is provided in a lid comprising the casing and sealing an open end thereof.

25. A method for providing an electrochemical cell, comprising the steps of:
   a) providing an anode;
   b) providing a cathode;
   c) housing the anode and the cathode in a casing having an open end;
   d) providing a lid supporting a lead insulated from the lid by a glass-to-metal seal;
   e) providing a groove extending from an inner surface of the lid a portion of the way through its thickness towards an outer surface and surrounding the lead, wherein the groove comprises a first side wall connected to a spaced apart second side wall by an intermediate bottom wall, the first and second side walls surrounding the lead at respective first and second distances, the first distance being less than the second distanced, wherein a phantom axial projection of the second side wall extends entirely through the lid thickness along the lead and wherein the intermediate bottom wall is parallel to inner and outer surrounded portions of the respective inner and outer surfaces of the lid, the surrounded inner and outer surface lid portions bounded by the phantom axial projection to an inner edge of the lid adjacent to and surrounding the insulated lead;
   f) hermetically sealing the lid to the open end of casing housing the anode and the cathode, the casing serving as a first terminal for one of the anode and the cathode, and the lead insulated from the lid serving as a second terminal for the other of the anode and the cathode and wherein, with the cell in its fully assembled condition, the groove is unoccupied and in pressure communication with the interior of the casing; and
   g) activating the anode and the cathode with an electrolyte.

26. An electrochemical cell, which comprises:
   a) an anode;
   b) a cathode;
   c) an electrolyte activating the anode and the cathode;
   d) a casing housing the activated anode and cathode disposed in its interior, wherein the casing serves as a first terminal for one of the anode and the cathode, and a lead insulated from the casing serves as a second terminal for the other of the anode and the cathode; and e) a groove extending from the inner surface of the casing a portion of the way through its thickness towards the outer surface and surrounding the lead insulated from the casing, wherein the groove surrounds the lead and comprises a first side wall connected to a spaced apart second side wall by an intermediate bottom wall, the first and second side walls surrounding the lead at respective first and second distances, the first distance being less than the second distance, wherein a phantom axial projection of the second side wall extends entirely through the casing thickness along the lead and wherein the intermediate bottom wall is parallel to at least one of the inner and outer surrounded portions of the respective inner and the outer surfaces of the casing, the at least one surrounded inner.and outer surface casing portion bounded by the phantom axial projection to an inner edge of the casing adjacent to and surrounding the insulated lead and wherein, with the cell in its fully assembled condition, the groove is unoccupied and in pressure communication with the interior of the casing.

27. A method for providing an electrochemical cell, comprising the steps of:

a) providing an anode;

b) providing a cathode;

c) housing the anode and the cathode in a casing having an open end;

d) providing a lid supporting a lead insulated from the lid by a glass-to-metal seal;

e) providing a groove extending from an inner surface of the lid a portion of the way through its thickness towards an outer surface and surrounding the lead, wherein the groove comprises a first side wall connected to a spaced apart second side wall by an intermediate bottom wall, the first and second side walls surrounding the lead at respective first and second distances, the first distance being less than the second distance, wherein a phantom axial projection of the second side wall extends entirely through the lid thickness along the lead and wherein the intermediate bottom wall is parallel to at least one of the inner and outer surrounded portions of the respective inner and the outer surfaces of the lid, the at least one surrounded inner and outer surface lid portion bounded by the phantom axial projection to an inner edge of the lid adjacent to and surrounding the insulated lead;

f) hermetically sealing the lid to the open end of the casing housing the anode and the cathode, the casing serving as a first terminal for one of the anode and the cathode, and the lead insulated from the lid serving as a second terminal for the other of the anode and the cathode and wherein, with the cell in its fully assembled condition, the groove is unoccupied and in pressure communication with the interior of the casing; and g) activating the anode and the cathode with an electrolyte.

28. A lid for closing an open end of a casing for an electrochemical cell, the lid comprising:

a thickness between an outer surface and an inner surface and having an opening through the lid thickness, wherein a groove extends from the inner surface of the lid a portion of the way through its thickness towards the outer surface and surrounding the opening, wherein the groove comprises a first side wall connected to a spaced apart second side wall by an intermediate bottom wall, the first and second side walls surrounding the opening at respective first and second distances, the first distance being less than the second distance, wherein a phantom axial projection of the second side wall extends entirely through the lid thickness along the opening and wherein the first and second side walls are parallel to each other and perpendicular to a surrounded portion of the outer surface of the lid extending perpendicularly from the phantom axial projection to an inner edge of the lid adjacent to and surrounding the opening and wherein the groove is intended to be unoccupied when the lid is secured to the casing to close its open end.

29. The lid of claim 28 wherein the groove is channel-shaped.

30. The lid of claim 28 wherein the groove is offset with respect to the opening.

31. The lid of claim 28 wherein the groove is multi-sided.

32. A lid for closing an open end of a casing for an electrochemical cell, the lid comprising:

a thickness between an outer surface and an inner surface and having an opening through the lid thickness, wherein a groove extends from the inner surface of the lid a portion of the way through its thickness towards the outer surface and surrounding the opening, wherein the groove comprises a first side wall connected to a spaced apart second side wall by an intermediate bottom wall, the first and second side walls surrounding the opening at respective first and second distances, the first distance being less than the second distance, wherein a phantom axial projection of the second side wall extends entirely through the lid thickness along the opening and wherein the intermediate bottom wall is parallel to inner and outer surrounded portions of the respective inner and outer surfaces of the lid, the surrounded inner and outer surface lid portions bounded by the phantom axial projection to an inner edge of the lid adjacent to and surrounding the opening and wherein the groove is intended to be unoccupied when the lid is secured to the casing to close its open end.

33. A lid for closing an open end of a casing for an electrochemical cell, the lid comprising:

a thickness between an outer surface and an inner surface and having an opening through the lid thickness, wherein a groove extends from the inner surface of the lid a portion of the way through its thickness towards the outer surface and surrounding the opening, wherein the groove comprises a first side wall connected to a spaced apart second side wall by an intermediate bottom wall, the first and second side walls surrounding the opening at respective first and second distances, the first distance being less than the second distance, wherein a phantom axial projection of the second side wall extends entirely through the lid thickness along the opening and wherein the intermediate bottom wall is parallel to at least one of the inner and outer surrounded portions of the respective inner and the outer surfaces of the lid, the at least one surrounded inner and outer surface lid portion bounded by the phantom axial projection to an inner edge of the lid adjacent to and surrounding the opening and wherein the groove is intended to be unoccupied when the lid is secured to the casing to close its open end.

* * * * *